United States Patent [19]

Maddox, Jr.

[11] Patent Number: 4,513,820
[45] Date of Patent: Apr. 30, 1985

[54] METHOD OF EXTRACTING AND REUTILIZING SURFACTANTS FROM EMULSIONS

[75] Inventor: Jim Maddox, Jr., Houston, Tex.

[73] Assignee: Texaco Inc., White Plains, N.Y.

[21] Appl. No.: 462,579

[22] Filed: Jan. 31, 1983

[51] Int. Cl.³ .......................... E21B 43/22; E21B 43/40
[52] U.S. Cl. ..................................... 166/266; 208/188; 252/8.55 D
[58] Field of Search ................. 252/8.55 D, 332; 166/266, 267, 274; 208/188

[56] References Cited

U.S. PATENT DOCUMENTS

| | | | |
|---|---|---|---|
| 3,637,521 | 1/1972 | Tsuk | 252/326 |
| 3,687,845 | 8/1972 | Treat . | |
| 3,952,803 | 4/1976 | Kerfoot et al. | 252/8.55 X |
| 4,029,570 | 6/1977 | Coffman et al. | 208/188 |
| 4,058,467 | 11/1977 | Sias | 252/8.55 |
| 4,073,344 | 2/1978 | Hall | 166/307 |
| 4,216,079 | 8/1980 | Newcombe | 208/188 |
| 4,235,712 | 11/1980 | McClaflin | 210/708 |
| 4,239,628 | 12/1980 | Vinatieri | 252/8.55 |
| 4,261,812 | 4/1981 | Newcombe | 208/188 |
| 4,277,352 | 7/1981 | Allison et al. | 252/8.55 D |
| 4,370,238 | 1/1983 | Tackett, Jr. | 210/639 |

*Primary Examiner*—Herbert B. Guynn
*Attorney, Agent, or Firm*—Robert A. Kulason; Jack H. Park; Harold J. Delhommer

[57] ABSTRACT

An invention for extracting surfactants from produced emulsions of oil, water and surfactant and concentrating the surfactants into a relatively small volume, emulsion phase that can be reutilized in surfactant flooding. The two phases left behind in the extraction are a substantially water-free and surfactant-free crude oil phase and an oil-free aqueous phase. The extracting compounds employed are the alkali metal salts and ammonium salts of cumene sulfonate, propyl benzene sulfonate, ethyl benzene sulfonate, methyl ethyl benzene sulfonate, diethyl benzene sulfonate, methyl propyl benzene sulfonate, xylene sulfonate and dicyclopentadiene sulfonate.

22 Claims, No Drawings

METHOD OF EXTRACTING AND REUTILIZING SURFACTANTS FROM EMULSIONS

FIELD OF THE INVENTION

This invention relates to the extraction and reutilization of surfactants from oil, water and chemical emulsions that are produced as a result of enhanced oil recovery operations.

BACKGROUND OF THE INVENTION

Surfactant flooding has become one of the more promising enhanced oil recovery techniques for recovering oil after water flooding. Generally, the method of surfactant flooding employs the injection of a surfactant in an aqueous solution or in an emulsion to sweep through the formation and recover oil. It is believed that surfactants are effective because of their ability to reduce the interfacial tension between crude oil and water. This reduction of interfacial tension permits the creation of various oil, water and surfactant emulsions in the formation. Thus, the produced liquids of surfactant flooding are generally very stable oil, water and surfactant emulsions.

Because of the relative amounts of oil and water produced in chemical flooding, the produced emulsions will usually be oil-in-water emulsions. Upon settling, such emulsions may change to the water-in-oil emulsions which are usually encountered in primary petroleum production. Conventional surfactant extraction and emulsion breaking techniques which work on water-in-oil emulsions may be ineffective with oil-in-water emulsions.

Second, the creation of these generally highly stable emulsions results in decreased surfactant reutilization efficiency. Considerable quantities of surfactants are entrained in the produced emulsions which prevents the effective reutilization of the produced surfactant in the continuing surfactant flooding process. Because surfactants are expensive additives for chemical floods, commercial economics require that surfactant costs be minimized by reutilizing a substantial quantity of surfactant that is injected into the formation. In addition, the methods which are available to separate the produced emulsions fail to extract and concentrate the produced surfactant sufficiently enough for reutilization of the surfactant.

One method of breaking an oil-in-water emulsion is described in U.S. Pat. No. 4,029,570 where an additional formation brine is added to the produced emulsion to produce an oil phase and a water phase. However, such brine addition treatments will in many cases not work on produced fluids. One reason is the tendency of formation rock to selectively adsorb high equivalent weight sulfonates, leaving lower equivalent weight sulfonates behind, rendering the surfactant highly hydrophilic. Such processes will not sufficiently extract and concentrate the surfactant to allow reutilization. The surfactant is often left highly diluted in a relatively large volume of oil-in-water emulsion unsuitable for reutilization.

U.S. Pat. No. 3,637,521 discloses an emulsion breaking process comprising the steps of (1) adding an acid to lower the pH of the emulsion to approximately 5.0 and (2) adding an alkylamine containing 1 to 5 nitrogen atoms and from 2 to 12 carbon atoms. U.S. Pat. No. 3,687,845 describes a process wherein oil-in-water emulsions are treated by the addition of a high molecular weight, watersoluble polymer such as the polyvinyl aromatics of benzene such as polystyrene, polyvinyl toluene and several acrylamide compounds.

Another method which has been tried to break oil-in-water emulsions is the use of additional surface active agents. U.S. Pat. No. 4,261,812 discloses a method which employs an additinal surface active agent having an average equivalent weight higher than the equivalent weight of the surface active agents in the produced emulsion, preferably an equivalent weight of about 400 to 600. U.S. Pat. No. 4,073,344 mentions the use of dimethylbenzene ammonium chloride, trimethyl ammonium chloride and alkyl benzene sulfonates for the same purpose. The use of additional solubilizers to break oil-in-water emulsions was promoted by U.S. Pat. No. 4,277,352 which suggests adding materials commonly used as solubilizers in surfactant flooding to the produced emulsion.

Although several of the above discussed methods may provide a way to free crude oil from produced emulsions, none of the references provide a process in which the surfactant can be economically recovered and concentrated for reuse.

SUMMARY OF THE INVENTION

The present invention provides for extracting surfactants from produced emulsions of oil, water and surfactant and concentrating the surfactants into a relatively small volume, emulsion phase that can be reutilized in surfactant flooding. The two phases left behind in the extraction are a substantially water-free and surfactant-free crude oil phase and a crude oil-free aqueous phase.

The surfactant extraction and concentration method of the present invention is performed by extractions employing the alkali metal salts and ammonium salts of cumene sulfonate, propyl benzene sulfonate, ethyl benzene sulfonate, methyl ethyl benzene sulfonate, diethyl benzene sulfonate, methyl propyl benzene sulfonate, xylene sulfonate and dicyclopentadiene sulfonate.

DETAILED DESCRIPTION

The extraction of surfactants from produced emulsions by the addition of various hydrotropes solves a difficult problem and permits the reutilization of the relatively expensive surfactants employed in chemical oil flooding operations. An additional advantage is provided by the recovery of crude oil substantially free of entrained surfactant and water impurities.

The invention comprises extracting surfactants from produced water-in-oil emulsions by the addition to the emulsion of extracting compounds such as the alkali metal salts and ammonium salts of cumene sulfonate, propyl benzene sulfonate, ethyl benzene sulfonate, methyl ethyl benzene sulfonate, diethyl benzene sulfonate, methyl propyl benzene sulfonate, xylene sulfonate, and dicyclopentadiene sulfonate. Ammonium salts offer very similar performance to alkali metal salts in enhanced oil recovery applications. The sodium salts of the above compounds are preferred.

During an appropriate settling time of about thirty to about sixty minutes, which may be considerably shorter or longer depending on conditions, most of the surfactant will partition into a relatively low volume, surfactant-rich emulsion middle phase. The crude oil phase which is partitioned is almost completely free of any surfactant or brine contamination. An oil-free aqueous phase is also partitioned which contains excess extracting compounds.

It should be noted that liquids may not settle into separate distinct phases all the time. At times, there may be a small boundary area between two phases which does not distinctly belong to either phase. Sometimes, a complete separation into several phases may take days. Thus, whenever the words "separate" and "separation" are used herein, they refer to a separation that is preponderantly complete.

At times, the addition of water or brine as well as clean crude oil to the emulsion before addition of the extracting compound will aid in extraction efficiency. Water should be added in a volume of about 1 to 5 times the volume of the emulsion. The mixture of water and emulsion is then allowed to separate over a period of time into two phases, an emulsion phase and an aqueous phase. An elevated temperature may aid in separation. The resulting emulsion is then processed according to the invention.

As in other steps of the extraction and reutilization process, fresh water and brine may be used interchangeably. Although different brines may require different extracting compound concentrations, the process yields excellent performance in both high and low salinities. Thus, fresh water may be used in the process where brine is mentioned, and brine may be employed where water is noted.

The surface active agents extracted may be the commonly used anionic surfactants such as petroleum sulfonates or nonionic surfactants. More specifically, the inventive method extracts surfactants such as alkylaryl sulfonates, alkoxylated alkyl phenol sulfonates, alkoxylated alkylphenol sulfates, alkoxylated sulphonated or sulphated alcohols.

Other materials which may be present in the produced emulsions are various thickening agents such as biopolymers and synthetic polymers, e.g., polysaccharides and polyacrylamides. Salts which occur naturally in the formation or were added to the flooding water may be present. Additionally, the invention process will also be effective in extracting surfactants from emulsions which contain various solubilizers, which are usually added to enhance surfactant solubility. The solubilizers include the water-soluble alcohols or polyhydric alcohols, ether alcohols, alkoxylated phenols and alkoxylated alkyl phenols, alkoxylated alcohols, polyalkoxylated mercaptans, as well as the sulfated or sulfonated derivatives of the alkoxylated phenols or the alkoxylated alcohols.

Produced emulsions will normally be in the form of oil-in-water emulsions and water-in-oil emulsions. Many times, an oil-in-water emulsion will separate over time with the aid of gravity to a water-in-oil emulsion and an aqueous phase. Oil soluble sulfonate surfactants usually speed up this process.

Certain pretreatment steps may be optionally employed to improve the extraction and concentration of the surfactants in the middle phase. Separation by gravity of the produced emulsion into predominantly oily and aqueous phases will reduce the volume of produced oily emulsion to be treated by the extraction method. Likewise, the employment of a heater treater or similar apparatus to process the produced emulsion prior to the extraction method will also substantially reduce the volume of the emulsion to be treated, as well as improve the efficiency of the extraction method.

Third, the addition of oil soluble, high equivalent weight surfactants to the produced emulsion may also significantly aid gravity separation in reducing oily emulsion volume. Sulfonate surfactants which tend to be oil soluble and have an average equivalent weight within the range of about 400 to about 600 are especially preferred for pretreatment of the produced emulsions. One example is the compound sold under the tradename TRS-18 by Witco Chemical Company having an equivalent weight of about 500. This oil soluble sulfonate may be added in concentrations ranging from about 0.5% to about 4.0%. However, the later addition of a water soluble sulfonate surfactant may be required for efficient extraction by the present invention when such oil soluble sulfonates are added during the pretreatment step.

The presence of certain polymers in the produced emulsion may also require a pretreatment washing step. Some biopolymers such as polysaccharides may cause the creation of a fourth phase and inhibit the extraction of surfactants into the middle phase with the method of the instant invention. But it has been discovered that the effect of these polymers on the extraction method can be obviated by adding brine or water in quantities of about 1 to about 5 volumes water per volume of emulsion to the emulsion, preferably a water-in-oil emulsion. The mixture is allowed to separate by gravity into two phases, an oily emulsion phase and an aqueous phase. Thereafter, the oily phase is employed as the produced emulsion in the extraction treatment.

The concentration of the extraction compounds added varies considerably with the different compounds employed. The cumene sulfonate salts and propylbenzene sulfonate salts may be effective at concentration levels ranging from about 0.3% to about 6.0%, preferably about 0.8% to about 2.0% of the brine employed. The ethyl benzene salts generally require concentration levels about 50% higher than the cumene and propyl benzene sulfonate salts, while the dicyclopentadiene sulfonate salts require about twice the concentration and the xylene sulfonate salts about two and a half times the concentration of the cumene sulfonate salts.

The lowest effective concentration of extraction compound required also varies substantially with the concentration of surfactants in the produced emulsion, the treating temperature, the salinity of the brine, and the types and concentrations of solubilizers and surfactants in the produced emulsion. For example, a higher concentration of extracting compound is required as surfactant concentration in the produced emulsion increases and as the extraction temperature increases. Higher brine salinities also require higher extracting compound concentrations.

The surfactant extraction is most effectively carried out at a temperature of about 35° C. to about 70° C., with about 50° C. to about 60° C. being the most preferred temperature range. Ideally, the produced emulsion and the extracting compound solution is preheated to the extraction temperature prior to mixing. But it should be noted that extractions can be successful with certain produced emulsions even at ambient temperatures. The temperature of extraction should be increased when excessive surfactant remains in the aqueous phase after treatment. Conversely, extraction temperature should be decreased when excessive surfactant remains in the water-free and normally surfactant-free oil phase.

Several other corrective steps are available to solve the problem of excessive surfactant remaining in the normally brine-free and surfactant-free oil phase and oil-free aqueous phase. Excessive surfactant in the aqueous phase may be remedied by the addition of brine or water in the initial treating step to reduce the extracting compound concentration. The addition of divalent ions such as calcium and magnesium will also reduce surfactant remaining in the aqueous phase. Increasing the extracting compound concentration will remedy the problem of excessive surfactant remaining in the normally surfactant-free and brine-free oil phase.

The preferred embodiment of the extraction method also includes the concurrent addition with the extracting compound of about 0.1% to about 3%, preferably about 0.5 to about 1.5% of a water soluble sulfonate having an equivalent weight of about 250 to about 450. This results in a substantially decreased middle phase volume having an increased concentration of surfactant contained therein. As before, the oil phase remains substantially surfactant-free and brine-free and the aqueous phase remains oil-free. An especially preferred water-soluble sulfonate is the compound sold under the tradename TRS-40 by Witco Chemical Company having an equivalent weight of about 350.

If the produced emulsion was an oil-in-water emulsion to which a substantial amount of an oil soluble sulfonate such as TRS-18 was added to reduce its volume and change the emulsion to a water-in-oil emulsion, then it may be necessary to add over 1.5% of the water soluble sulfonate.

The extraction method may be practiced in either a batch or continuous manner. Most of the extracting compound is partitioned into the oil-free aqueous phase. Thus, the aqueous phase may be recycled and used to treat additional produced emulsion. But since some extracting compound is lost to the middle phase, additional extracting compound must be added to the used aqueous phase before it is employed again for additional extraction. Likewise, make-up brine may also be required.

For continuous surfactant extraction, it is suggested that an apparatus similar to the widely used, vertical type heater treater or similar to the apparatus disclosed in U.S. Pat. Nos. 2,354,856 and 2,753,046 be employed. The suggested apparatus consists of a vertical cylindrical vessel having perforated plates or baffles spaced throughout the vessel to minimize turbulence in the treating vessel.

The vessel should contain a column of brine having dissolved therein the extracting compound with the column maintained at a constant extraction temperature between about 35° C. and about 70° C. The produced emulsion is treated by injecting it at the bottom of the vessel and dispersing it within the extracting compound solution by conventional techniques such as impellers, atomizing jets, or static mixers without causing significant turbulence in the upper part of the liquid column. In rising through the column of brine and extracting compound, surfactants are extracted from the dispersed crude oil droplets. At the top of the column, substantially surfactant-free and brine-free crude oil is withdrawn while the surfactants, in the form of a middle phase emulsion, collect in the zone between the water-free crude oil and the aqueous phase. The middle phase is withdrawn whenever a predetermined volume is exceeded. The solution of brine and extracting compound remains in the vessel and is supplemented with additional extracting compound and brine when needed.

Automatic maintenance of the volumetric ratio of the phases is accomplished by placing sensors within at least two of the phases. The first sensor is set at the bottom of the crude oil phase to detect any significant increase in surfactant or brine concentration of the crude oil, with any such increase triggering the introduction of concentrated extracting compound solution into the fluids entering the vessel. A second sensor is set to detect any significant increase in surfactant or oil in the bottom aqueous phase, with any such increase triggering the introduction of dilute extracting compound solution or brine into the fluids entering the vessel. In a like manner, the sensors terminate the flow of additives when phase volumes and composition normalize. Conductivity-resistivity sensors and FT-IR (Fourier Transform-Infrared Spectroscopy) sensors are examples of instrumentation suitable for electronic transmission of start-stop signals to the pumps controlling introduction of extracting compound solution.

Gas evolution from the emulsions to be treated can be minimized by pressurizing the treating vessel or by pretreating the emulsions to remove such gases. It is further suggested that a portion of the treated, surfactant-free oil be recirculated to act as a diluent for the produced emulsion entering the vessel. Under certain conditions, this will increase extraction efficiency.

The relatively low volume middle phase containing a high concentration of surfactants may be directly injected into the formation as a surfactant slug in a chemical flood, thus, reutilizing the originally injected surfactant. The use of the middle phase of the present extraction invention as a surfactant slug in chemical flooding can produce a substantial savings in the quantities of relatively expensive surfactants that are employed for such flooding, significantly improving the economics of surfactant flooding.

The middle phase may be injected "as is" or in conjunction with other materials as a substitute for the surfactant flooding slug. Recovery efficiencies with the "as is" middle phases will often substantially approach the recovery efficiencies of the originally injected surfactant floods. When the middle phase is supplemented with additional solubilizers, surfactants, or most preferably, the originally injected surfactant flooding composition, total recovery efficiencies usually equal or surpass the recovery efficiencies of the original flooding composition. Depending on the composition of the emulsions and the formation to be flooded, it is preferred that the middle phase be mixed with the surfactant composition originally injected in ratios of about 3:1 to about 1:3.

It has also been discovered that the addition of various solubilizers to the middle phase in concentrations ranging from about 0.3% to about 3% increases recovery efficiency under certain conditions. A preferred solubilizer is a composition of sulfated derivatives of alkoxylated alcohols sold under the tradename Alfonic 1412A by Conoco Inc. added in the preferred concentration range of about 0.5% to about 1.5%.

The addition of Alfonic 1412A to a polymer slug following the surfactant also solves two problems encountered in the reutilization of the middle phase in a surfactant slug for chemical flooding. It has been noted in some instances that the injection of a polymer slug following the middle phase significantly increases the pressure change as well as increasing surfactant loss to the core matrix. However, the addition of the Alfonic 1412A solubilizer to the polymer slug in ranges of 0.5% to 1.0% produces a pressure differential and surfactant loss similar to the originally designed surfactant slug and also improves recovery efficiency to a value substantially equal to or surpassing that of the originally designed surfactant system.

The following examples further illustrate the novel surfactant extraction and reutilization method of the present invention. These examples are given by way of illustration and not as limitations on the scope of the invention. Thus, it should be understood that the steps and materials employed in the instant method may be varied to achieve similar results within the scope of the invention.

EXAMPLE 1

The surfactant extraction process was tried on a produced emulsion from a West Texas field which produces crude oil with an API gravity of about 30° and connate water salinities of about 79,000 g/m$^3$ total dissolved solids and about 8,800 g/m$^3$ of divalent ions. The field was flooded with a surfactant slug composed of 1.64% Witco TRS-18, 1.86% Witco TRS-40, 1.55% Alfonic 1412A, 0.95% sodium cumene sulfonate, 4.0% gas oil, 4.0% clean crude oil from the same field, 10% fresh water and formation brine for the remainder.

The fluids produced from this flood were in the form of a surfactant-containing oil-in-water emulsion. When separated into a water-in-oil emulsion phase and an aqueous phase by a heater treater, most of the surfactant partitioned into the emulsion phase. 80 cm$^3$ of surfactant-free formation crude oil was mixed with 40 cm$^3$ of the water-in-oil emulsion phase and added to a separatory funnel containing 320 cm$^3$ of formation brine and 1.9% sodium cumene sulfonate. The temperature of the fluids was increased to about 55° C. before the funnel was shaken to disperse the oil in the brine solution of sodium cumene sulfonate (SCS).

The fluids were allowed to separate into three phases, which required 15 to 30 minutes. The bottom phase, an oil-free aqueous phase containing sodium cumene sulfonate, was withdrawn and reutilized in subsequent extractions. The surfactant-rich middle phase was also withdrawn. The top phase consisted of substantially water-free and surfactant-free crude oil.

The sodium cumene sulfonate solution previously withdrawn was returned to the separatory funnel, along with 0.7 grams of 45% active sodium cumene sulfonate to replace the extracting compound lost to the middle phase. 40 cm$^3$ of the water-in-oil and 80 cm$^3$ surfactant-free crude were added and the previous steps were repeated for a total of five complete extractions.

Middle phase volume in each of the five extractions was about 45 to 50 cm$^3$. The middle phase samples were pooled and analyzed by two phase titration and Fourier Transform-Infrared Spectroscopy (FT-IR), along with representative samples of the other two phases. The following results were obtained.

TABLE I

| Sample | Titration, meq/L Surfactant | FT-IR, %* Water | Oil | Surfactant |
| --- | --- | --- | --- | --- |
| Target Microemulsion | 100 | 86 | 8 | 6 |
| Produced Emulsion | 115 | 10 | 80 | 10 |
| Middle Phase | 91 | 74 | 6 | 20 |
| Clean Crude Phase | 0 | 0 | 100 | Trace |
| Aqueous Phase | na | 99 | 0 | 1 |

*Fourier Transform-Infrared Spectroscopy

Both the two phase titration and the FT-IR analyses indicated that the extraction procedure resulted in practically complete partitioning of surfactants from the water-in-oil emulsion to the middle phase. The FT-IR analysis for surfactant in the middle phase was higher than the titration value and is of doubtful validity. Based on the titration data, middle phase surfactant concentration was about 5.4% (vs. 6% in target microemulsion). FT-IR analysis also indicated that the crude oil was dehydrated by the procedure, leaving a substantially surfactant-free and water-free crude oil phase. Surfactant in the aqueous phase was primarily sodium cumene sulfonate.

EXAMPLE 2

Surfactants were extracted from a produced emulsion originating from a Southern Illinois field having a crude oil API gravity of about 35° and connate fluids with a salinity of about 64,000 g/m$^3$ and a divalent ion concentration of about 3,000 g/m$^3$. The field was flooded with a 5% surfactant blend in field brine composed of 1.8% Witco TRS-18, 1.8% Witco TRS-40 and 1.4% of a sulfated derivative of an ethoxylated alcohol having about twelve to fourteen carbon atoms and an average equivalent weight of about 550 sold under the trademark LN60 COS by Texaco Chemical Co.

A 1.1% sodium cumene sulfonate solution was prepared in 180 cm$^3$ of brine from the Illinois field. 120 cm$^3$ of produced water-in-oil emulsion and 60 cm$^3$ of surfactant-free crude from the Illinois field were added to the extraction solution in a separatory funnel after being preheated to 55° C. The components were mixed and allowed to separate into three phases at 55° C. Separation time was approximately 30 minutes. The resulting phase volumes were as follows:

| | |
| --- | --- |
| Aqueous | 170 cm$^3$ |
| Middle Phase | 54 cm$^3$ |
| Clean Crude Oil | 133 cm$^3$ |
| Fluids Lost | 7 cm$^3$ |

FT-IR analysis gave the results below in Table II.

TABLE II

| Sample | Percent Water | Oil | Surfactant |
| --- | --- | --- | --- |
| Produced Emulsion | 16 | 82 | 2 |
| Middle Phase | 57 | 39 | 4 |
| Oil Phase | 0 | 100 | 0 |
| Aqueous Phase | 99 | 0 | 1 |

Analysis indicated that the sodium cumene sulfonate extraction partitioned substantially all of the surfactant into the middle phase leaving a substantially surfactant-free and water-free crude oil phase and an oil-free aqueous phase.

EXAMPLES 3–10

Multiple extraction tests were run on the produced emulsion from the West Texas field employed in Example I. One volume of water-in-oil emulsion was diluted with two volumes of surfactant-free crude oil from the West Texas field. The emulsion and oil blend containing 1% surfactant and 4.5% brine (according to FT-IR analysis) was extracted at 55° C. with an equal volume of brine from the West Texas field to which the test extracting compounds were added. Table III lists the minimum concentration of test extracting compound required to yield three phases, including a substantially surfactant-free and water-free oil phase, a middle-phase and a oil-free aqueous phase.

TABLE III

| EXAMPLE | EXTRACTING COMPOUND | REQUIRED CONC., % |
|---|---|---|
| 3. | Benzene sulfonate, sodium salt | 6+ |
| 4. | Toluene sulfonate, sodium salt | 6+ |
| 5. | Xylene sulfonate, sodium salt | 3.9 |
| 6. | Ethyl benzene sulfonate, sodium salt | 2.5 |
| 7. | Cumene sulfonate, sodium salt | 1.7 |
| 8. | Naphthalene sulfonic acid* | 0.85 |
| 9. | Dicyclopentadiene sulfonate, sodium salt | 3.1 |
| 10. | Alfonic 1412A | No Phase Separation |

*$Na^+$ salt not soluble in brine

The results indicated that the most effective type of extracting compound was a benzene ring with a two to three carbon chain attached. The cumene, xylene, and ethyl benzene sulfonates were the most effective extraction compounds tested. The sodium dicyclopentadiene sulfonate was also effective at about twice the required concentration for sodium cumene sulfonate. Aromatic rings with substantially longer alkyl side chains are much less water soluble and consequently, are not effective extracting compounds for this process.

The naphthalene sulfonic acid could not be tested as a sodium salt, but was effective at relatively low concentrations in the acid form. However, naphthalene sulfonic acid is a highly corrosive chemical.

A solubilizer, Conoco's Alfonic 1412A was also tried as an extracting compound. Low, medium and high concentrations of 1412A failed to produce phase separation into the three distinct phases of the present invention.

EXAMPLES 11–12

In previous surfactant extractions, the surfactant concentrations in the produced emulsions were not varied. In these two examples, extractions were performed with sodium cumene sulfonate on the West Texas and Southern Illinois produced emulsions containing varying surfactant concentrations. The surfactant concentrations were varied by diluting the produced water-in-oil emulsions with surfactant-free formation crudes. The ratio of oily emulsion to brine solution was maintained at 1:1. Values given are the optimum sodium cumene sulfonate concentrations required to extract surfactants from the oily emulsion, yielding three separate phases. Significant differences were noted between the optimum concentrations of extracting compounds for the West Texas and Southern Illinois emulsions.

TABLE IV

EXAMPLE 11
WEST TEXAS EMULSION

| Optimum Sodium Cumene Sulfonate Concentration, % | Surfactant Concentration, meq/l |
|---|---|
| 1.25 | 17 |
| 1.35 | 34 |
| 1.45 | 68 |
| 1.5 | 102 |
| 1.55 | 136 |

EXAMPLE 12
ILLINOIS EMULSION

| Optimum Sodium Cumene Sulfonate Concentration | Surfactant Concentration |
|---|---|
| 0.8% | 6.0 meq/l |
| 1.0% | 12.0 meq/l |
| 1.1% | 24.0 meq/l |
| 1.2% | 36.0 meq/l |

EXAMPLE 13

Extraction tests were conducted to determine the effect of different extraction temperatures on the required concentration of extracting compound. The produced emulsion containing the Southern Illinois crude of Example 2 was employed for sodium cumene sulfonate extractions at different temperatures. Increased extraction temperature required an increased concentration of extracting compound as indicated in Table V.

TABLE V

| Optimum Sodium Cumene Sulfonate Concentration, % | Temperature °C. |
|---|---|
| 0.9 | 43 |
| 1.0 | 49 |
| 1.1 | 55 |
| 1.3 | 60 |

EXAMPLE 14

One volume of produced water-in-oil emulsion from the West Texas field was diluted with two volumes of clean crude oil. 20 cm³ of this diluted emulsion was extracted with 20 cm³ field brine containing 1.9% sodium cumene sulfonate at 55° C. A parallel run was performed with 1% Witco TRS-40 dissolved in another 20 cm³ aliquot of diluted emulsion prior to extracting with 1.15% sodium cumene sulfonate brine solution. The comparative data is presented in TABLE VI and VIa.

TABLE VI

| | Lower Phase, cm³ | Middle Phase, cm³ | Upper Phase, cm³ |
|---|---|---|---|
| Emulsion only | 16.0 | 9.7 | 14.3 |
| Emulsion + 1% TRS-40 | 17.8 | 5.8 | 16.4 |

Untreated emulsion and extracted midphase compositions, as determined by FT-IR analysis, were as follows:

TABLE VIa

| | Water, % | Surfactant, % | Oil, % |
|---|---|---|---|
| Untreated emulsion | 8 | 2 | 90 |
| Midphase | 54 | 7 | 39 |
| Midphase + 1% TRS-40 | 53 | 9 | 38 |

The results indicated that the efficiency of extraction may be increased by adding a water soluble sulfonate such as Witco's TRS-40 having an average equivalent weight of about 350 to emulsions comparable to those produced at the West Texas field. The middle phase volume was reduced by approximately 40% with a concomitant increase in surfactant concentration. The concentration of sodium cumene sulfonate required for the extraction also was reduced.

It is believed that the improvement in extraction efficiency is due to a higher ratio of water soluble sulfonate to oil soluble sulfonate surfactants present in the emulsion to be extracted. The addition of TRS-40 increased the ratio of water soluble sulfonate to oil soluble sulfonate surfactants. It should be noted that the ratio of TRS-40 to TRS-18 in the originally injected surfactant slug which yielded the produced emulsion used in this example was about 1:1. With the addition of the TRS-40, the ratio of TRS-40 to TRS-18 increased to about 1.75:1.

EXAMPLE 15

A simulated produced emulsion was prepared with crude oil and brine from the same West Texas field. The surfactant system was comprised of 1.44% TRS-40, 0.66% TRS-18, 0.9% of an ethoxylated sulfate having an average equivalent weight of about 500 sold under the trademark N50 COS by Texaco Chemical Co., and the remainder field brine. 15 cm$^3$ of surfactant solution were mixed with 50 cm$^3$ of clean crude and 200 cm$^3$ of field brine to form a simulated produced emulsion. The emulsion was aged for five hours at 43° C. Separation occurred giving two phases, 54 cm$^3$ of a surfactant-rich, water-in-oil emulsion phase and 244 cm$^3$ of a brine phase (Step 1).

The 54 cm$^3$ of emulsion was mixed with 62 cm$^3$ of 1.1% sodium cumene sulfonate in field brine and aged for one half hour at 55° C. (Step 2). The emulsion separated into three distinct phases, one of which was a relatively small volume middle phase having a high concentration of surfactant. It should be noted that the increased surfactant extraction efficiency which resulted in a smaller, more highly concentrated middle phase can probably be ascribed to the high ratio of water soluble sulfonates to oil soluble sulfonates (TRS-40/TRS-18) in the emulsion. See the discussion in Example 14 above.

Analysis of the phases yielded the compositions below.

TABLE VII

| Simulated Emulsion | Vol. cm$^3$ | 2-Phase Titration meq/l | FT-IR, % | | |
|---|---|---|---|---|---|
| | | | H$_2$O | Oil | Surfactant |
| Step #1-aqueous | 244 | 0.1 | — | — | — |
| Step #1-emulsion | 54 | end point poor | 11 | 87.8 | 1.2 |
| Step #2-aqueous | 57 | 2.6 | 99 | 0 | 1* |
| Step #2-midphase | 10 | end point poor | 65 | 23 | 12 |
| Step #2-oil | 44 | 2.0 | 0 | 100 | 0 |
| Target System | — | 100 | 97 | 0 | 3 |

*Sodium cumene sulfonate retained in aqueous phase

EXAMPLES 16-17

Certain produced emulsions collected from the West Texas field source of Example 1 had been previously treated with the oil soluble sulfonate, Witco TRS-18, to reduce the volume of water-in-oil emulsion. When the reduced volume emulsion samples were mixed with sodium cumene sulfonate solution for surfactant extraction, it was discovered that the surfactants could not be extracted from the emulsion at any extracting compound concentration. This was the case for three separate runs.

Compensatory quantities of the water soluble sulfonate TRS-40 were added to the emulsions prior to surfactant extraction. The extractions proceeded normally when about 3% weight per volume of the TRS-40 was added to the emulsions. FT-IR analysis of the three phases resulting from the extractions gave the results in Table VIII.

TABLE VIII

| Phase | Water, % | Oil, % | Surfactant, % |
|---|---|---|---|
| Lower (aqueous) | 98.5 | 0 | 1.5* |
| Middle | 60.0 | 30.0 | 10.0 |
| Upper (oil) | Trace | 100 | Trace |

*Sodium Cumene Sulfonate

EXAMPLE 18

It was discovered that the surfactant extraction technique performed poorly with produced water-in-oil emulsions that contained biopolymers such as Flocon 4800, a trademarked polysaccharide sold by Pfizer, Inc. The presence of the biopolymer substantially diminished the efficiency of the extraction process. The problem involved formation of progressively larger volumes of a fourth phase in successive extractions with the recycled aqueous phase containing the extracting compound. The fourth phase formed between the oil-free aqueous phase and a nominal middle phase. FT-IR analysis indicated that the biopolymer was partitioning from the middle phase emulsion into the aqueous phase and fourth phase.

This problem was solved by washing the produced water-in-oil emulsion with brine and then allowing the mixture of emulsion and brine to separate into oily and aqueous phases prior to employing the extraction method of the present invention. The brine wash removed polymer from the emulsion, allowing the extraction of water-in-oil emulsion to proceed normally.

EXAMPLES 19-22

Comparative core floods were performed with extracted middle phases from the West Texas produced emulsion of Example 1. These floods were conducted at 43° C. in a Baker Limestone core having a length of 30.5 cm, a pore volume of 130 cm$^3$ and a permeability of 58 millidarcies. The connate fluids in the core were brine from the West Texas field and clean crude from the same field containing 25% added heptane. Chemical slug size was 0.18 pore volume in all floods, followed by continuous injection of a 1,000 ppm polysaccharide polymer in deionized water, sold under the trademark Rhodopol by Rhone-Poulenc Chemical Co.

Four floods were undertaken. The first was a core flood with the surfactant slug originally injected at the West Texas field. The second core flood employed the middle phase from the extraction process of Example 1 with 0.1% TRS-18 added. The third core flood consisted of the middle phase plus 0.1% TRS-18 and 0.1% Alfonic 1412A. The fourth core flood was comprised of two thirds of the originally injected surfactant slug plus one third middle phase from the extraction process of Example 1 and 0.033% TRS-18. The results are listed below.

TABLE IX

NET RECOVERY EFFICIENCY (%) OBTAINED BY FLOODING

| | Pore Volumes | | | | |
|---|---|---|---|---|---|
| | 0.5 | 0.75 | 1.0 | 1.25 | 1.5 |
| 19. Original Surfactant Slug | 8 | 30 | 45 | 57 | 61 |
| 20. Midphase + 0.1% TRS-18 | 14 | 33 | 45 | 52 | 58 |
| 21. Example 20 + 0.1% 1412A | 14 | 36 | 45 | 47 | 47 |
| 22. ⅓ Example 19 + ⅔ Example 20 | 6 | 22 | 42 | 52 | 59 |

The table shows that the recovery efficiencies for all of the floods containing the middle phase were slightly lower than the originally designed system per pore volume injected. However, the amount of surfactant in the middle phase floods was probably lower than that of the originally designed surfactant system, as noted in Example 1.

Best results with the middle phase were obtained with the fourth core flood consisting of one third middle phase, two thirds originally injected surfactant slug and 0.033% TRS-18. This blend of original surfactant slug and middle phase at a two to one ratio achieved a relatively high recovery efficiency of 61%, the same as that of the original designed surfactant slug, but at a greater injected pore volume of about 1.6 compared to about 1.35. The fourth core flood suggests that blending of the originally injected surfactant with the middle phase from the extraction process is an effective technique for reutilizing surfactants without any further treatment of the extracted surfactant contained in the middle phase.

The original surfactant slug (Example 19) performed better than the slugs containing extracted middle phase (Examples 20-22) by exhibiting lower surfactant retention by the core and by having a significantly lower pressure buildup across the core during polymer injection. A remedy for these middle phase injection problems is discussed in the section on Examples 32-34.

EXAMPLES 23-26

The middle phase from the Example 17 extractions of the West Texas produced emulsions were employed in core floods. These produced emulsions had an additional 3.0% TRS-40 added to balance the effect of the excess TRS-18 employed to reduce emulsion volume. Four core floods were performed using the same procedure employed in Examples 19-22 with 0.15 pore volume surfactant slugs. The target emulsion slug was followed by 1,000 ppm Rhodopol polymer in deionized water. 0.5% Alfonic 1412A was added to the polymer slug in Examples 24-26.

Recovery efficiency percentages are given in both total and net figures below.

TABLE X

| Surfactant System | Recovery Efficiency, % | | Oil in Slug, %* | Surfactant in Slug, %* |
|---|---|---|---|---|
| | Total | Net | | |
| 23. Target microemul. | 65 | 62 | 8.0 | 6.0 |
| 24. SCS ext'n midphase | 59 | 46 | 30.0 | 10.0 |
| 25. SCS ext'n midphase + 0.5% 1412A | 73 | 63 | 20.6 | 10.9 |
| 26. 1:1 blend of Ex. 23 & 25 | 77 | 70 | 17.6 | 8.6 |

*FT-IR data

The core floods of Examples 25 and 26 wherein the solubilizer Alfonic 1412A was added to the middle phase and the middle phase was blended with the original target system gave higher net recovery efficiencies than the originally designed target surfactant system. Total recovery efficiencies were higher than net recovery efficiencies because the surfactant slugs injected contained oil which was recovered in most cases.

As shown in Example 22 and as shown here in Example 26, the best recovery efficiencies were achieved with a blend of the middle phase from the extraction process and the original target surfactant slug. Consequently, the present extraction process permits the reutilization of surfactant with substantial cost savings and a greater recovery efficiency than the originally designed surfactant system. As stated previously, the addition of the solubilizer Alfonic 1412A to the polymer solution solved the injection pressure problems noted when a polymer slug followed the middle phase (West Texas Field) of the extraction process. Recovery efficiency was also higher with this blend of middle phase and Alfonic 1412A, probably because this particular middle phase was deficient in solubilizer.

EXAMPLES 27-31

Several comparative core floods were performed at 25° C. with the Southern Illinois extracted middle phase of Example 2 which was blended with varying amounts of the originally injected surfactant system. Measurements were made in a 30.5 cm fired Berea sandstone core with a permeability of 832 millidarcies and a pore volume of 136 cm$^3$. In all floods, initial oil saturation was about 70% and residual oil saturation was 37% to 38% after flooding with field brine. Surfactant slugs of 0.18 pore volume were followed by 1,000 ppm Rhodopol in deionized water. Table XI illustrates the results.

TABLE XI

| Example | Middle Phase (Vol %) | Target System (Vol %) | Net Recovery Efficiency (%) |
|---|---|---|---|
| 27 | 0 | 100 | 71 |
| 28 | 50 | 50 | 70 |
| 29 | 75 | 25 | 68 |
| 30 | 100 | 0 | 65 |
| 31* | 100 | 0 | 65 |

*1.47% (w/v) surfactant blend (Example 2) added

These core floods conducted with the extracted middle phase from the Southern Illinois water-in-oil emulsions contrasted directly with the reutilization studies conducted with West Texas fluids (Examples 20-22). No problems were encountered with increased injection pressures or unusual surfactant loss when slugs containing polymer alone followed the middle phase slugs (Examples 28-31).

EXAMPLES 32-34

As previously noted, problems of increased injection pressures and surfactant loss were noted when the extracted middle phases from the West Texas produced emulsions were reutilized. Screening tests on several different alcohol and solubilizer chemicals indicated that when the common solubilizer Alfonic 1412A was added to polymer solutions, problems of increased injection pressure and surfactant loss were solved. Core floods following the procedure of Examples 19-22 were conducted to determine the effect of the Alfonic 1412A addition on total recovery efficiency. Core flood results wherein varying amounts of Alfonic 1412A were dissolved in the polymer slug which followed the middle phase surfactant slug are listed below in Table XII.

TABLE XII

| Example | % of Alfonic 1412A in Rhodopol Slug | Total Recovery Efficiency |
|---|---|---|
| 32 | 0 | 49.0 |
| 33 | 0.3 | 56.5 |
| 34 | 0.5 | 61.0 |
| 35 | 1.0 | 56.0 |
| 36 | 0 (Target System) | 61.5 |

Not only did the addition of the solubilizer to the polymer slug solve the injection problems, but it also improved overall core flood performance. Use of the solubilizer additive in the polymer slug resulted in injection pressure differences and surfactant retention patterns similar to that of the original target surfactant floods. Optimum solubilizer concentration in the polymer appeared to be about 0.5%. Addition of 0.5% of the solubilizer gave a total recovery efficiency similar to that of the original flooding system.

Many other variations and modifications may be made in the concept described above by those skilled in the art without departing from the concept of the present invention. Accordingly, it should be clearly understood that the concepts disclosed in the description are illustrative only and are not intended as limitations on the scope of the invention.

What is claimed is:

1. A method for extracting and concentrating enhanced oil recovery surfactants into a relatively small volume surfactant-rich middle phase from produced emulsions comprising oil, water and surfactant, which comprises:
    mixing a produced emulsion with an extracting compound solution of water containing about 0.3% to about 6.0% of an extracting compound selected from the group consisting of the alkali metal salts and ammonium salts of propyl benzene sulfonate, cumene sulfonate, ethyl benzene sulfonate, methyl ethyl benzene sulfonate, diethyl benzene sulfonate, methyl propyl benzene sulfonate, xylene sulfonate and dicyclopentadiene sulfonate; and
    allowing the mixture of produced emulsion and extracting compound solution to separate into at least three phases, including a substantially surfactant-free and water-free crude oil phase, a relatively low volume middle phase containing surfactant, oil and water, and an oil-free aqueous phase.

2. The method of claim 1, wherein the produced emulsion is processed through a heater treater to reduce the volume of emulsion to be mixed with the extracting compound solution.

3. The method of claim 1, wherein the water containing the extracting compound is a brine.

4. The method of claim 1, wherein the steps of mixing and allowing the mixture to separate are carried out at a temperature of about 35° C. to about 70° C.

5. The method of claim 4, wherein the extraction is carried out at an increased temperature when excessive surfactant remains in the aqueous phase.

6. The method of claim 4, wherein the extraction is carried out at a decreased temperature when excessive surfactant remains in the oil phase.

7. The method of claim 1, wherein the oil-free aqueous phase is supplemented with additional extracting compound and mixed with an emulsion phase for subsequent extractions.

8. The method of claim 1, wherein about 0.1% to about 3.0% of a water soluble surfactant is mixed with the produced emulsion prior to mixing the produced emulsion with the extracting compound solution.

9. The method of claim 8 wherein the water soluble surfactant is a sulfonate compound having an average equivalent weight of about 250 to about 450.

10. The method of claim 1, wherein additional water is added to the produced emulsion to reduce the concentration of the extracting compound when excessive surfactant remains in the aqueous phase.

11. The method of claim 1, wherein divalent ions are added to the produced emulsion when excessive surfactant remains in the aqueous phase.

12. The method of claim 1, wherein the concentration of the extracting compound is increased when excessive surfactant remains in the oil phase.

13. A method for extracting and concentrating enhanced oil recovery surfactants into a relativey small volume surfactant-rich middle phase from produced emulsions comprising oil, water and surfactant, which comprises:
    mixing a produced emulsion with a volume of water equal to about one to about five times the volume of the produced emulsion;
    allowing the mixture of water and produced emulsion to separate into two phases, an emulsion phase and an aqueous phase;
    mixing the emulsion phase with water containing about 0.3% to about 6.0% of an extracting compound selected from the group consisting of the alkali metal salts and ammonium salts of propyl benzene sulfonate, cumene sulfonate, ethyl benzene sulfonate, methyl ethyl benzene sulfonate, diethyl benzene sulfonate, methyl propyl benzene sulfonate, xylene sulfonate and dicyclopentadiene sulfonate; and
    allowing the mixture of emulsion phase and extracting compound solution to separate into at least three phases, including a substantially surfactant-free and water-free crude oil phase, a relatively low volume middle phase containing surfactant, oil and water, and an oil-free aqueous phase.

14. The method of claim 13, wherein the separating into two phases of the produced emulsion occurs at an elevated temperature.

15. A method for extracting and concentrating en-. hanced oil recovery surfactants into a relatively small volume, surfactant-rich middle phase from produced emulsions comprising oil, brine and surfactant, which comprises:
    allowing the produced emulsion to settle into two phases, an emulsion phase and an aqueous phase;
    mixing the emulsion phase with a brine solution containing about 0.1% to about 3.0% of a water soluble sulfonate surfactant and about 0.3% to about 6% of an extracting compound selected from the group consisting of the sodium salts of propyl benzene sulfonate, cumene sulfonate, ethyl benzene sulfonate, methyl ethyl benzene sulfonate, diethyl benzene sulfonate, methyl propyl benzene sulfonate, xylene sulfonate and dicyclopentadiene sulfonate at a temperature of about 45° C. to about 65° C.; and
    allowing the mixture of emulsion, and extracting compound and water soluble sulfonate solution to separate into at least three phases, including a substantially surfactant-free and brine-free crude oil phase, a relatively low volume middle phase containing surfactant, oil and brine and an oil-free aqueous phase.

16. A method for reutilizing surfactants in a surfactant flood that are entrained within a produced emulsion comprising oil, water and surfactant, which comprises:

allowing the produced emulsion to settle into two phases, an emulsion phase and an aqueous phase;

mixing the emulsion phase with water containing about 0.3% to about 6.0% of an extracting compound selected from the group consisting of the alkali metal salts and ammonium salts of propyl benzene sulfonate, cumene sulfonate, ethyl benzene sulfonate, methyl ethyl benzene sulfonate, diethyl benzene sulfonate, methyl propyl benzene sulfonate, xylene sulfonate and dicyclopentadiene sulfonate;

allowing the mixture of emulsion, and extracting compound solution to separate into at least three phases, including a substantially surfactant-free and water-free crude oil phase, a relatively low volume middle phase containing surfactant, oil and water, and an oil-free aqueous phase; and injecting the middle phase as a surfactant slug in a surfactant flood.

17. The method of claim 16, wherein the middle phase is mixed with a surfactant and injected as a surfactant slug in a surfactant flood.

18. The method of claim 16, wherein about 0.3% to about 3.0% of a solubilizer is added to the middle phase prior to injection as a surfactant slug in a surfactant flood.

19. The method of claim 18, wherein the solubilizer is comprised of sulfated derivatives of alkoxylated alcohols.

20. The method of claim 16, wherein the middle phase is mixed with a composition and then injected as a surfactant slug in a surfactant flood, said composition being the same in makeup as the surfactant slug originally injected into the formation.

21. The method of claim 16, wherein a polymer slug is injected into the formation after the injection of the middle phase, said polymer slug containing a solubilizer.

22. A method of reutilzing surfactants in a surfactant flood that are entrained within a produced emulsion comprising oil, brine and surfactant, which comprises:

allowing the produced emulsion to settle into two phases, an emulsion phase and an aqueous phase;

mixing the emulsion phase with a brine solution containing about 0.1% to about 3.0% of a water soluble sulfonate surfactant and about 0.3% to about 6% of an extracting compound selected from the group consisting of the sodium salts of propyl benzene sulfonate, cumene sulfonate, ethyl benzene sulfonate, methyl ethyl benzene sulfonate, diethyl benzene sulfonate, methyl propyl benzene sulfonate, xylene sulfonate and dicyclopentadiene sulfonate at a temperature of about 45° C. to about 65° C.;

allowing the mixture of emulsion, and extracting compound and water souble sulfonate solution to separate into at least three phases, including a surfactant-free and brine-free crude oil phase, a relatively low volume middle phase containing surfactant, oil and brine, and an oil-free aqueous phase;

mixing with the middle phase a composition which is the same in makeup as the surfactant slug originally injected into the formation; and injecting the middle phase mixture as a surfactant slug in a surfactant flood.

* * * * *